Sept. 12, 1939.  L. B. HUTHSING  2,172,975
HYDRAULIC CLUTCH
Filed Oct. 23, 1937

INVENTOR.
Leo B. Huthsing
BY
ATTORNEY.

Patented Sept. 12, 1939

2,172,975

UNITED STATES PATENT OFFICE 2,172,975

HYDRAULIC CLUTCH

Leo B. Huthsing, Los Angeles, Calif.

Application October 23, 1937, Serial No. 170,671

5 Claims. (Cl. 192—60)

My invention relates to hydraulic clutches adapted for a variety of purposes, but which I have shown as a hydraulic clutch for winches.

Among the salient objects of my invention are:

To provide a simple, practical and quick-acting clutch which can be controlled in a very simple and easy manner to drive the winch or other member connected therewith.

To provide a hydraulic clutch in which a double piston-like member is secured to a shaft, to turn therewith, with cylinder-like members movably mounted over said piston-like members, and which are operable in an eccentrically formed casing or body, to turn freely therein or to wedge therein so as to drive said casing or body, said casing or body being secured to the winch or other member to be driven.

To provide in a hydraulic clutch of the character referred to a self-contained mechanism filled with oil or other suitable liquid which can be circulated therein by the relative movements of the cylinder-like members over the piston-like members, with a simple valve for closing the passageways in a way to lock said cylinder-like members against relative movement and to cause them to wedge or grip the inside of the eccentric body.

Other advantages and features of improvement will appear from the following description of one practical embodiment of my invention, shown on the accompanying sheet of drawing, in which—

Figure 1:
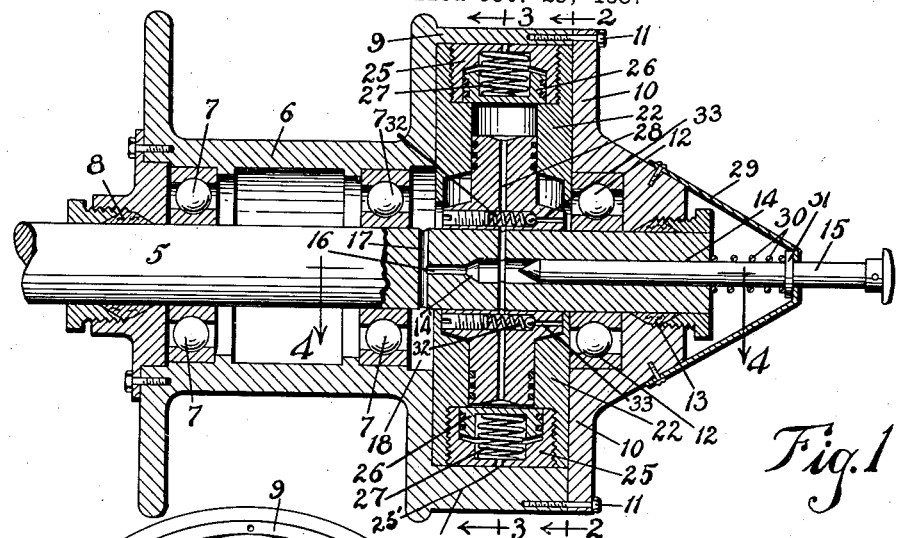
Figure 1 is a longitudinal sectional view through a winch and hydraulic clutch mechanism embodying my invention.

Referring now in detail to the drawing, a power or drive shaft 5 is shown with a winch or pulley 6 mounted thereon, with suitable ball-bearing mountings 7, 7, therein, and with suitable bushing and packing at 8 to prevent any escape of oil or other liquid therein. On the end of said winch or pulley 6 is a cylindrical body or case 9, eccentrically formed, as will be evidenced by the thickness of the lower side thereof in Figs. 2 and 3, Fig. 2 being an end view with the outer plate or member 10 removed. Said outer plate or member 10 is secured in place by means of screw bolts 11, 11, and has therein ball bearing mounting 12, and also a bushing and packing 13. The end of the power or drive shaft 5 has a central bore 14, to receive a valve rod 15, tapered at its inner end to seat in a reduced part of said bore designated 14', said bore being continued in a reduced form, as at 16, and intersecting a transverse bore 17 through said shaft 5, which transverse bore 17 communicates at its opposite ends with a space 18 within the winch or pulley 6, as clearly seen in Fig. 1.

Figure 3:
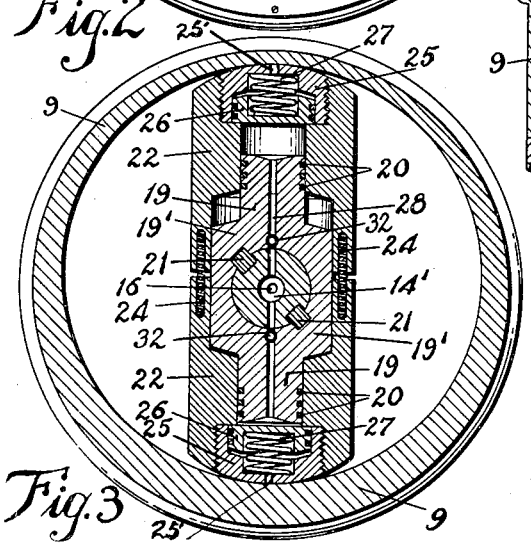
Figure 3 is a transverse sectional view therethrough taken on line 3—3 of Fig. 1.
Figure 4:
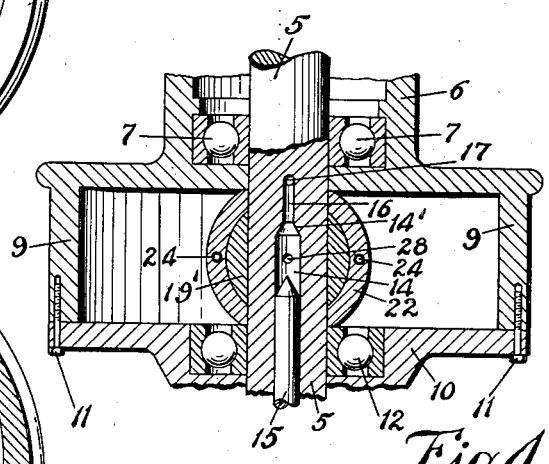
Figure 4 is a fragmentary longitudinal sectional view taken on the line 4—4 of Fig. 1.

Securely keyed to said shaft 5, within said case or body 9, is a double ended piston-like member 19, having the middle round portion 19' and the reduced piston-like portions, 19, 19, with the usual piston rings 20, 20, thereon, said member being secured to the shaft by the keys 21, 21, Fig. 3.

Slidably mounted over the opposed piston portions 19, 19, are two cylindrical members 22, 22, having their opposite sides flat, as at 22', 22', to bear against the end walls of the body and outer plate 10, said members 22, 22, having their adjacent ends, at opposite sides, cut away, as at 23, 23, to give clearance for a limited longitudinal movement. Said adjacent ends are also provided with inset coiled springs 24, 24, which operate to normally hold said cylindrical members 22, 22, yielding apart.

In the outer ends of said cylindrical members are set two screw plugs, as 25, 25, having therein short pistons 26, 26, with coiled springs 27, 27, normally pressing them inwardly, said short pistons 26, 26, operating to take the sudden shock, if any, when the free flow of the oil or fluid is stopped by closing the valve rod 15, again referred to.

Figure 2:
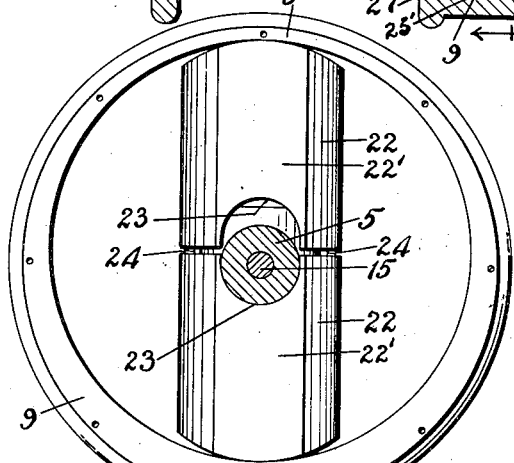
Figure 2 is a transverse sectional view therethrough taken on line 2—2 of Fig. 1.

Said piston member 19 has therethrough, longitudinally thereof, a passageway or bore 28, which intersects the central bore 14 in the shaft 5, and at its opposite ends is open to the spaces in the cylinder members 22, 22, and against the short pistons 26, 26, as seen in Figs. 1 and 3.

Mounted on the outer plate 10, is a cone shaped cap 29, through which the outer end of the valve rod 15 extends, and within which, on said valve rod, is a coiled spring 30, operating against a collar 31 on said valve rod, to normally hold said valve rod 15 in its outer or open position, as seen in Fig. 1.

It will be understood that the interior of the members 9 and 6 are filled with oil or other suitable liquid, and that when the valve rod 15 is out, as shown, the oil is circulated through the open passages by the movement of the cylinder members 22, 22, over the piston-like members 19, 19, as said piston-like members are revolved with the power shaft 5, said cylinder members 22, 22, being moved by the inner surface of the eccentric body 9, said movements being free and easy so long as the valve rod 15 is out and the passages 28, 16 and 17 are open. When the valve rod 15 is pushed in the passages 28 and 16 are closed and the oil is no longer free to escape from the spaces at the ends of the pistons 19, 19, and when said cylinder members 22, 22, cannot move longitudinally, their ends, which are rounded to a ground fit, bind or lock to the body 9.

The double ended piston member 19, is provided with passageways with spring check valves therein, as at 32, 32, 33, 33, at opposite sides of said shaft 5 and parallel with said shaft, as seen clearly in Fig. 1, to permit the hydraulic fluid to escape from the outer side of the piston member to the opposite side thereof.

The screw plug members 25, 25, in the opposite ends of the cylinder members 22, 22, are provided with small bleeder openings 25', 25', so that in case any oil should get past the springs 27, 27, it could escape into the body 9 as said members revolve therein. Thus I have provided a compact and practical hydraulic clutch, with simple means for controlling the same, and while I have shown and described in detail one practical form or embodiment of the invention, I am aware that changes in the details of construction and arrangement can be made therein without departing from the spirit thereof, and I do not, therefore, limit the invention to the showing made for descriptive purposes, except as I may be limited by the hereto appended claims.

I claim:

1. A hydraulic clutch mechanism including in combination, a drive shaft having a central bore into one end thereof and a transverse bore therethrough intersecting said central bore; a valve rod movable longitudinally in said central bore to close said transverse bore, a double ended piston member mounted transversely on said shaft and secured thereto and having a passageway therethrough longitudinally to intersect and communicate with the transverse bore through said shaft, cylinder members movably mounted over the opposite pistons at opposite sides of said shaft, a member to be driven, said member having secured thereto a body having therein a cylindrical chamber eccentrically positioned relative to said shaft, within which said cylinder members and said double ended piston member turns with said shaft, the ends of said cylinder members being adapted to have locking engagement with said eccentric chamber when said cylinder members are held against relative movement on said pistons, a liquid filling said body and said cylinder members and said passageways, said valve rod being adapted to be moved to close said passageways and prevent circulation of said liquid, whereby to prevent relative movement of said cylinder members on said pistons, and means yieldingly holding said cylinder members apart while permitting transverse bodily movement thereof on said drive shaft.

2. A hydraulic clutch including in combination: a drive shaft, a member thereon to be driven, said member having a cylindrical chamber positioned eccentrically of said shaft, a double ended piston member therein, secured to said shaft, with its piston portions extended in opposite directions radially from said shaft within said eccentric chamber, cylinder members adapted to said piston portions and telescoping thereover with their outer ends closed and adapted to be moved into wedging engagement with said eccentric chamber wall to lock said shaft to said member to be driven, said chamber and cylinder members being adapted to be filled with a hydraulic liquid, passageways formed in said piston member and said shaft with valve means adapted to be operated to prevent flow of said hydraulic liquid from said cylinder members and said pistons, whereby to cause said cylinder members to lock with said eccentric cylinder wall, for the purpose referred to, and cushioning means within the ends of said cylinders at the ends of said pistons, to absorb shock.

3. In a clutch mechanism, in combination, a driving member, a driven member, and controllable driving means therebetween and including a double ended piston secured transversely on said driving member to extend radially from opposite sides thereof, within said driven member, cylinder members placed over said piston ends and having their inner ends fitting around said driving member, whereby to position their inner ends together, spring means interposed between said adjacent inner ends to yieldingly move them apart, said inner ends having clearance around said driving member to permit radial longitudinal movement of said cylinder members together, the outer ends of said cylinder members having therein friction means to frictionally engage said driven member and said driven member being eccentrically positioned around said driving member and said cylinder members, and spring cushioning members interposed between said pistons and the outer ends of said cylindrical members, a hydraulic fluid in said driven member and said cylinders to be circulated by the relative movement of said cylinder members on said double ended piston, and valve means operable to stop circulation movement of said fluid, whereby to prevent relative movement of said cylinder members on said double ended piston, and to lock said cylinder members to said driven member.

4. In a hydraulic clutch, a member have a cylindrical, eccentrically positioned inner wall, a drive shaft centrally of said member, a double ended piston member secured to said drive shaft, transversely thereof, to turn therewith within said eccentrically positioned wall, cylinder members over said double ended piston member and movable together in opposite directions thereon into frictional engagement with the inner eccentric wall of said first member, and a spring pressed cushion member in the outer end of each of said cylinder members, a hydraulic fluid in said clutch mechanism and said cylinder members, and adapted to be circulated by the movement of said cylinder members on said double ended piston member, and valve means manually operable for closing the passageway for said fluid, whereby to cause said cylinder members to be forced into holding frictional engagement with said first member.

5. In a clutch mechanism, a driving shaft, a cylindrical driven member, the interior of which is eccentrically positioned relative to said shaft, a double ended piston member transversely on said shaft and secured thereto to turn therewith within said cylindrical member, a hydraulic fluid within said driven member, cylinder members on the opposite ends of said double ended piston member, valve means for controlling the movement of said fluid, and means interposed between the outer ends of said cylinder members and the outer ends of said piston operable by said fluid for causing cushioning action of said hydraulic fluid between said cylinder members and the ends of said piston members.

LEO B. HUTHSING.